United States Patent [19]

Adiletta

[11] Patent Number: 4,671,979
[45] Date of Patent: Jun. 9, 1987

[54] INSULATING STRUCTURE
[75] Inventor: Joseph G. Adiletta, Thompson, Conn.
[73] Assignee: Pall Corporation, Glen Cove, N.Y.
[21] Appl. No.: 781,902
[22] Filed: Sep. 30, 1985
[51] Int. Cl.[4] .......................... B32B 1/04; B32B 3/02
[52] U.S. Cl. ..................................... 428/74; 428/68; 428/76; 428/99; 428/188; 428/192; 428/193; 428/198; 428/223; 428/233; 428/238; 428/239; 428/285; 428/288
[58] Field of Search ................... 428/68, 74, 76, 192, 428/193, 198, 285, 188, 99, 223

[56] References Cited
U.S. PATENT DOCUMENTS 3,993,828 11/1976 McConsley, III .................. 428/251
4,513,041 4/1985 Delluc ................................ 428/76

FOREIGN PATENT DOCUMENTS 677227 8/1952 United Kingdom .................. 428/68
848608 9/1960 United Kingdom .
1411610 10/1975 United Kingdom .
2131347A 6/1984 United Kingdom .

Primary Examiner—George F. Lesmes
Assistant Examiner—S. Gibson
Attorney, Agent, or Firm—Leydig, Voit & Mayer

[57] ABSTRACT

An insulating structure is provided for which comprises:
(1) insulating material comprising one or more high-density, thermal/acoustical layers of highly bonded fibers; and
(2) a chemically resistant, impermeable envelope enclosing said insulating material.

Preferably, the insulating material also comprises one or more acoustical layers of loosely woven fiber cloth having openings correlated to the wavelength of the sound to be attenuated.

Preferably the insulating structures of the subject invention comprise sealed mounting flanges extending from the edges of the envelope and means for removably attaching the insulation to the surface to be insulated.

13 Claims, 7 Drawing Figures

INSULATING STRUCTURE

TECHNICAL FIELD

This invention is related to insulating structures. More particularly, it is directed to insulating structures which can be used under extreme conditions of heat and noise and which additionally may be exposed to conditions of nuclear, biological or chemical warfare.

BACKGROUND ART

Personnel operating a wide variety of vehicles must be insulated from excessive heat and noise gen-erated by such vehicles. Delicate equipment also must be insulated. It is a regrettable fact that both man and machine may be exposed to nuclear, biological or chemical warfare. The severe heat and noise generated by combat vehicles and the conditions of such warfare combine to place rigorous demands on thermal/acoustical insulation. Although the insulating structures of the subject invention may be used in less demanding systems, they will be discussed in the context of those most extreme circumstances.

Fiberglass often is selected for insulation because of its low initial cost, availability in a wide range of thicknesses, and its good thermal and sound attenuation properties. Conventional fiberglass, however, has several undesirable properties which must be overcome.

Conventional fiberglass typically comprises a highly lofted layer of bonded fiberglass mounted on a paper backing. While air does not flow freely through the structure, some circulation does occur and, in fact, conventional fiberglass acts more in the nature of an air trap or circulation constraint. Thus, the structure of conventional fiberglass is best described as a circulating, continuous matrix of air in which glass fibers are dispersed.

Conventional fiberglass generally has high loft, i.e., low density, because for a given mass of fibers, as the loft is increased the relative proportion per volume of the better thermal conductor, glass, is reduced in favor of the poorer thermal conductor, air. At higher lofts, therefore, the overall thermal conductivity per unit volume will be decreased. Assuming no air circulation, the fiberglass also will have a higher insulating value.

Thus, relatively thick layers of conventional fiberglass are required for adequate thermal insulation. Added thickness can be a problem, however, in combat vehicles where space constraints are severe.

Reducing the loft does decrease air circulation, and thus, tends to increase the insulating value of the fiberglass. That increase, however, does not offset the corresponding decrease caused by increasing the relative proportion per volume of glass to air. Thus, its loft must be maintained within relatively narrow limits if the optimum insulating value of conventional fiberglass is to be realized.

Conventional fiberglass, however, compresses easily under load, and under vibrating conditions its fibers tend to loosen, break and settle. Vibrating conditions may create problems in attaching the fiberglass as well.

The threshold heat resistance of fiberglass is limited to that of its binder resin. That threshold generally is in the vicinity of 300 degrees Fahrenheit (° F.). Turbine engines in tanks and similar vehicles, however, can create wall temperatures as high as 500° F. or even higher. Under such conditions the conventional binder will flow or decompose and thereby compromise the structural integrity of the fiberglass.

Modern aircraft create an extremely noisy environment. Often the sound levels will be particularly high for certain frequencies. Because of its structure, conventional fiberglass cannot be varied to attenuate specific sound frequencies or a particular pattern of frequencies produced by different engine power levels or by different types of noise-generating equipment.

Fiberglass also can become saturated with oil fumes and thereby create potential fire hazards. Such hazards are particularly acute under extreme thermal conditions, especially where the possibility of flame or sparks exists.

During nuclear, biological or chemical warfare, the insulation may be exposed to a variety of chemicals. Fiberglass absorbs many chemicals that cannot be washed out, nor can it be decontaminated by steam. Water or steam pressure breaks up its fiber structure and degrades its insulating properties.

The subject invention, therefore, is directed to insulating structures which effectively attenuate heat and sound at reduced thicknesses. It also is directed to thermal/acoustical insulating structures having increased resistance to compression, flexibility for comforming it to irregular surfaces and/or structural integrity under vibrating conditions. It is directed as well to thermal/acoustical insulating structures which can be mounted on surfaces as hot as 500° F. It is directed further to thermal/acoustical insulating structures which selectively attenuate particular sound frequencies or distributions of sound frequencies. Finally, it is directed to non-absorbing thermal/acoustical insulating structures, the surfaces of which can be easily washed and decontaminated with no impairment of insulation properties.

DISCLOSURE OF THE INVENTION

This invention is directed to insulating structures comprising:
(1) insulating material comprising one or more high-density, thermal/acoustical layers of highly bonded fibers; and
(2) a chemically resistant, impermeable envelope enclosing said insulating material.

Preferably, the insulating material also comprises one or more acoustical layers of loosely woven fiber cloth.

Preferably the insulating structures of the subject invention comprise sealed mounting flanges extending from the edges of the envelope and means for removably attaching the insulation to the surface to be insulated.

BEST MODE FOR CARRYING OUT THE INVENTION

Thermal/acoustical Layers

Figure 1:
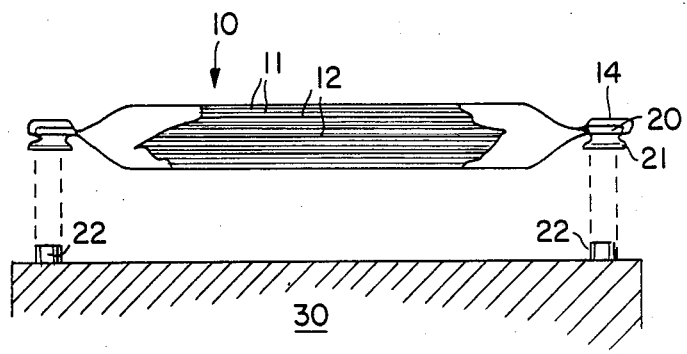
FIG. 1 is a cross-section of a preferred insulating structure shown in FIG. 2 additionally comprising a preferred fastening means.

The thermal/acoustical layers provide significant attenuation of both heat and sound. That is not to say, however, that the insulating structures which comprise them must be used to insulate both heat and sound, only that such properties are present in the layers regardless of whether they are needed for a given application.

The thermal/acoustical layers comprise highly bonded fibers. The binder used therein preferably is thermally stable at temperatures up to at least 400° F., and thereby the threshold heat-resistance of the insulating material is increased. The fibers are highly bonded, and the layer has a relatively high density. Thus, the insulating material is much less compressible than conventional insulation. In contrast to conventional thermal insulation, which has a circulating, continuous matrix of air, even when compressed, the thermal/acoustical layers used herein define large numbers of relatively small, isolated, air pockets which substantially eliminate circulation. The layers, therefore, are able to combine excellent insulating characteristics at reduced thickness and with excellent structural characteristics.

A variety of microfibers may be used, preferably microfibers which are chemically and mechanically stable at temperatures up to 400° F. It will be understood, however, that fibers having lesser or greater thermal stability may be utilized when the structure will be used to insulate, respectively, lower or higher temperatures. Many inorganic microfibers, e.g., titanate microfibers, meet those requirements and may be used. Suitable titanate fibers are available from commercial manufacturers, such as Otsuka Chemical Company, Ltd. (Japan) and E. I. DuPont de Nemours and Company, Wilmington, Delaware.

Glass fibers, however, are especially preferred fibers in that they have good thermal properties and low cost. A wide variety of suitable glass fibers is commercially available. Preferred fibers, in contrast to the fibers in conventional fiberglass, are finer, having diameters of from about 0.1 to about 5 micrometers compared to diameters of up to about 20 micrometers for conventional fiberglass fibers. The median length of the glass microfibers to diameter ratio will generally be in the range of from about 500 to about 1,000. Glass microfibers of this type are available from commercial manufacturers, such as PPG Industries, Johns-Mansville, Inc., and Owen-Corning Fiberglass Corporation, as well as other manufacturers.

A variety of resins may be used, preferably resins which are thermally stable at temperatures up to about 400° F. It will be understood, however, that resins having lesser or greater thermal stability may be used when the structure is used to insulate, respectively, lower or higher temperatures.

Examples of suitable binder resins include conventional thermosetting resins, such as polysulfones, polyesters, acrylics, phenolics, epoxy, epoxy/phenolic, and flame-retardant resins, such as chlorinated ethylene vinyl acetatel. Fluorocarbon polymers, e.g., polytetrafluoroethylene and fluorinated ethylenepropylene polymers also may be used. Thermoplastic fluorocarbon polymers, such as fluorinated ethylenepropylene polymers, are especially preferred in that, as opposed to such polymers as polytetrafluoroethylene which sinter, they provide enhanced fiber-to-fiber binding. Generally, however, their cost makes the fluorocarbon polymers less desirable.

The thermal/acoustical fiber layers generally will have thickness of from about 10 to about 200 mils. They have relatively high densities, i.e., from about 3.0 to about 8.0, preferably about 6.0 pounds per cubic foot (lb/ft$^3$) as compared to from about 0.5 to about 1.0 lb/ft$^3$ for conventional, relatively low-density fiberglass. In contrast to conventional fiberglass, which is compressed easily, the fiber layers of the subject invention are much less compressible. They comprise a multiplicity of relatively small, isolated air pockets, the size of which preferably approaches the diameter size of the fibers, i.e., from about 0.1 to about 10 micrometers.

Additionally, the thermal/acoustical layers are relatively highly bonded, i.e., the majority of fiber-to-fiber contacts in the layers are bonded by the resin and, because they have higher densities, those layers have more fiber-to-fiber contacts per unit volume and unit weight than conventional fiberglass. Thus, the amount of binder resin generally will be from about 5 to about 20 weight percent (wt %) based on the weight of the fibers.

They may be made by conventional methods, e.g., by laying down an aqueous slurry of the fibers which comprises a dispersion of the resin, drying, and curing. One form of suitable fiber layers comprised of glass fibers is commercially available from Pallflex, Inc., Putnam, Connecticut, which markets them for use as filtration material or electrical insulation.

Acoustical Layers

Although the thermal/acoustical layers alone can provide significant noise attenuation, it is preferred that the insulating material additionally comprise one or more acoustical layers. Such layers provide enhanced noise attenuation and allow for selective attenuation of particular frequencies. The acoustical layers also enhance to a degree the thermal insulating properties of the structure.

The acoustical layers comprise a loosely woven fiber cloth, preferably a coated, loosely woven fiber cloth. The cloth may be made of any suitable microfibers, such as those disclosed above for use in the thermal/acoustical layers. Similarly, the microfibers preferably will be thermally stable at temperatures up to 400° F. It will be understood, however, that microfibers having lesser or greater thermal stability may be used when the structure is used to insulate, respectively, lower or higher temperatures. Loosely woven fiberglass is an especially preferred cloth.

By varying the size of the openings in the loosely woven cloth one can selectively attenuate particular frequencies. As a general rule, the openings must be smaller than the wavelength of the frequency which is to be attenuated. Given the range of frequencies encountered and audible to the human ear, therefore, the loosely woven cloth will have openings ranging from about 0.050 to about 5.0 millimeters (mm). Woven fiberglass of this type is available from commercial manufacturers, such as Burlington and J. P. Stevens.

The sound attenuation properties of the loosely woven cloth are enhanced by coating the cloth to increase its mass. Where the cloth has large openings, the coating also aids in maintaining the structural integrity of the cloth. The cloth may be coated with any of the resins disclosed above for use in the thermal/acoustical layers. Coating may be accomplished by conventional methods, e.g., by dip-impregnating the cloth in a dispersion of the resin, drying, and curing. Suitable coated, loosely woven fiberglass, however, is available from commercial manufacturers, such as Pallflex, Inc., Putnam, Connecticut, which markets the cloth for use in oven conveyor belts.

Envelope

The envelope is designed to prevent absorption by the insulating material of oil fumes and contaminants from nuclear, biological or chemical warfare. Any contaminants which collect on the envelope surface, however, can be cleaned without affecting the insulating properties of the structure. The envelope also facilitates removable attachment of the structure. Finally, the envelope enhances the overall attenuation properties of the structure.

The envelope may be constructed of any chemically resistant, impervious, flexible material. Such materials include, e.g., fluorocarbon or silicone rubber-coated woven fiberglass. Woven fiberglass, if used for the envelope, in contrast to that comprising the multiple layers of insulating materials, should be tightly woven.

The woven fiberglass may be coated with any chemically inert, water-impervious material which is chemically and structurally stable at the temperatures which are to be insulated. When the structures are to be used at lower temperatures, i.e., below 250° F., polyurethane and neoprene rubber coatings, for example, may be used. Fluorocarbon polymers and silicone rubber are preferred, however, because they have greater thermal stability. Thermoplastic fluorocarbons, such as fluorinated ethylene-propylene polymers, are especially preferred in that they are among the most chemically-resistant materials known. They are also preferred, however, because they flow during curing, thereby producing a film-like coating over the woven fiberglass which is impervious to both water and water vapor. Where increased flexibility is desired, however, such as when the insulating material must be wrapped around corners or pipes, silicone rubber may be preferred as the coating since it has greater flexibility than the fluorocarbon polymers.

The coated woven fiberglass material may be coated in the same general manner as described above for the acoustical layers, e.g., by dip-impregnating or the like. Suitable materials are available commercially, however, from plastic supply firms such as McMaster-Carr Company, Dayton, N.J.

Construction Of The Insulating Structure

The insulating material generally will comprise from about 5 to about 100 layers per inch of the thermal/acoustical layers. The overall thickness of the insulating material generally will be from about 0.25 to about 2 inches.

The overall thickness, however, will vary according to the temperature of the heat source which must be insulated and the degree of insulation required. For example, where the insulation is needed to protect human operators, the structure should comprise a thickness sufficient to reduce the exposed side of the structure to a temperature in the range of 120° to 140° F., the upper limit of tolerance for skin contact. If the insulation is needed to protect equipment, more or less insulating material may be needed to provide the requisite level of insulation.

Where enhanced sound attenuation is desired, preferably the insulating material comprises, in addition to the thermal/acoustical layers, one or more acoustical layers, generally from 1 to about 5 layers per inch. The acoustical layers may have different opening sizes, thereby providing for selective attenuation of more than one frequency.

The envelope should surround completely the insulating material and can be made, e.g., from two sheets of the coated woven fiberglass. The edges of the sheets, however, should be sealed thoroughly in a manner such that the seals are as impervious as the layers themselves. Because they provide easier and more thorough sealing, thermoplastic coatings are preferred. If simple heat sealing is inadequate, adhesives may be used. For example, when the sheets are coated with silicone rubber, silicone rubber adhesives are especially preferred in that their properties are similar to those of the coating.

The best mode for carrying out the invention will be further described by reference to FIGS. 1–7.

Figures 2, 3:
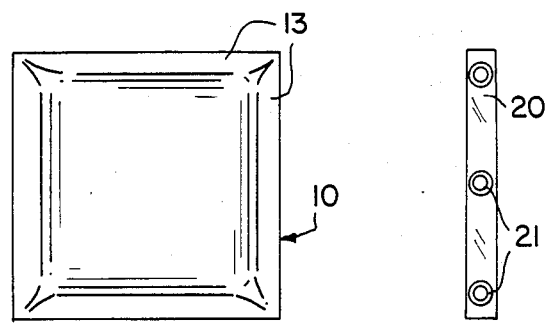
FIG. 2 is a top view of a preferred insulating structure.
FIG. 3 is a botton view of the strip 20 shown in FIG. 1.
Figure 5:
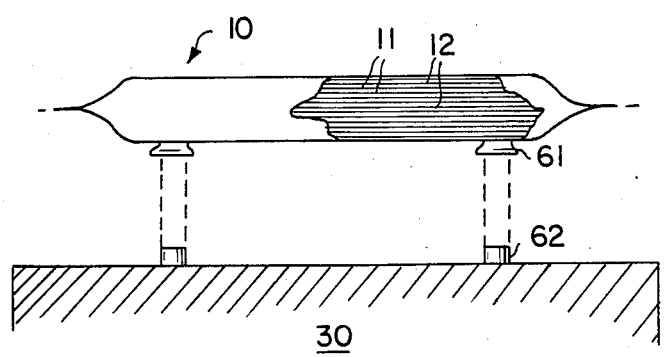
FIG. 5 is a cross-sectional view of the preferred insulating structure shown in FIG. 2 additionally comprising other preferred fastening means.

As shown in FIGS. 1 and 5, the insulating material comprises interlaid multiple thermal/acoustical layers 11 and multiple acoustical layers 12. The envelope 10 completely surrounds the insulating material and, as shown in FIG. 2, comprises sealed mounting flanges 13 extending from each edge of the envelope. The structure may be affixed to the surface to be insulated, e.g., by driving rivets (not shown) through the mounting flanges 13 into the surface to be insulated. The attachment means should not compromise to any significant degree the seal or imperviousness of the envelope 10. Preferably, however, the structure also is removably attached.

Figure 4:
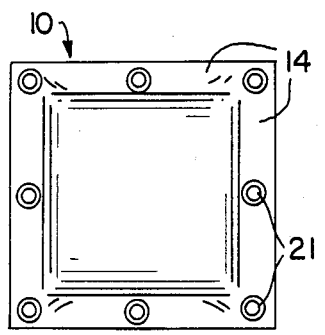
FIG. 4 is a bottom view of the preferred insulating structure of FIG. 1.

Preferred means for removably attaching the structure include, e.g., grommets or holes (not shown) in the mounting flanges 13 positioned for fastening or hanging. Especially preferred are strips 20 comprising, as shown in FIGS. 1, 3 and 4, at various pitch intervals, a plurality of female snap parts 21. Strips 20 would be mounted in hems 14 constructed for that purpose from the sealed mounting flanges 13 of the envelope 10. The hems 14 would comprise a plurality of holes (not shown) on one of their sides corresponding to the female snap parts 21. As shown in FIGS. 1 and 4, the strips 20 would be mounted within the hems 14 such that the female snap parts 21 project through the corresponding holes. A plurality of male snap parts 22 then would be mounted correspondingly to the female snap parts 21 on the surface 30 which is to be insulated. That preferred fastening system would enable the structure to be attached in a secure manner and easily removed, e.g., for replacement or decontamination.

Figure 6:
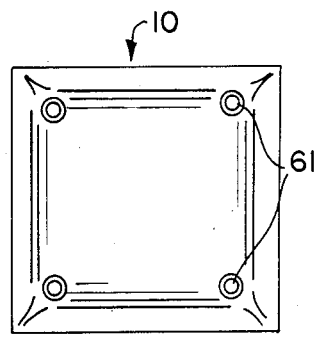
FIG. 6 is a bottom view of the preferred insulating structure of FIG. 5.
Figure 7:
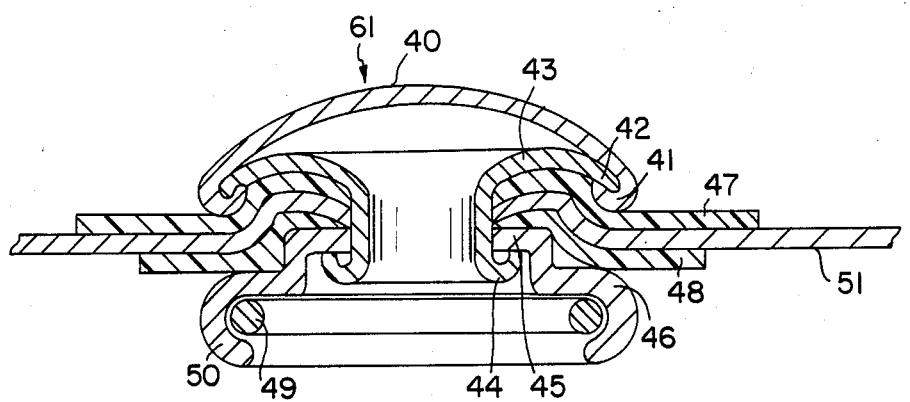
FIG. 7 is an enlarged cross sectional view of the female snap parts 61 mounted as shown in FIGS. 5 and 6.

As shown in FIGS. 5–7, another preferred fastening system would comprise a plurality of female snap parts 61 mounted at various pitches through the surface of the envelope 10. A plurality of male snap parts 62 then would be mounted correspondingly to the female snap parts 61 on the surface 30 which is to be insulated. As shown in FIGS. 5 and 7, in this preferred fastening system, the attachment means would be mounted through the flexible material of which the envelope 10 is constructed. The female snap parts 61, of course, would be mounted through the surface of the envelope 10 in such a way that the imperviousness of the envelope 10 is not compromised, i.e., the seal around the female snap parts 61 should be as impervious as the envelope itself. As shown in FIG. 7, a preferred mounting system comprises a female snap parts 61 which comprise a chrome brass cap 40, the rim 41 of which, is compression crimped around the upper rim 42 of a generally flared, cylindrically shaped middle member 43, the lower rim 44 of which, in turn is compression crimped around the upper rim 45 of a lower member 46. As can be seen, the cap 40, middle member 43, and the lower member 46 are assembled and cooperate to overlap and compress a silicone rubber inner washer 47, a teflon washer 48, and portions of the coated fabric 51 of the envelope 10. The female snap part 61 also comprises a spring snap 49 which is restrained by the lower rim 50 of the lower member 46.

When mounted in such a manner, the fastening system would be located entirely between the surface 30 to be insulated and the insulating layers 11 and 12. Such means, therefore, would not compromise in any significant way the insulating properties of the structure.

The structure may be formed into shapes corresponding to the surfaces which are to be insulated. When such customization is not possible or desirable, however, the structure may be formed into units, e.g., square units, which can be removably attached to the surface to be insulated and to each other.

The best mode for carrying out the invention will be further described by reference to the following examples.

EXAMPLES

Insulating structures within the scope of this invention were constructed and evaluated against commercial grade fiberglass as described below.

Structure 1 was constructed of 14 thermal/acoustical layers of non-woven fiberglass highly bonded with a phenolic/epoxy resin, said layers having fibers of diameters from about 0.75 to about 1.59 micrometers, from about 5 to about 15 wt % resin (based on weight of fibers), a density of about 5.4 lb/ft$^3$, and a thickness of about 7.0 mils; 1 acoustical layer of woven fiberglass coated with an epoxy resin, said layers having about 20 wt % resin (based on weight of fibers), and openings of about 0.67 mm; and an envelope of two sheets of tightly woven fiberglass cloth imperviously coated with polytetrafluoroethylene (Model Number TFE30, obtained from DuPont de Nemours & Co.) and heat-sealed around their edges.

Structure 1 had outer dimensions of approximately 7×7×1 inch.

Structure 2 was constructed of 7 thermal/acoustical layers of non-woven fiberglass highly bonded with a phenolic/epoxy resin, said layers having fibers of diameters from about 0.75 to about 1.59 micrometers, from about 5 to about 15 wt % resin (based on weight of fibers), a density of about 5.4 lb/ft$^3$, and a thickness of about 7.0 mils; 1 acoustical layer of woven fiberglass coated with an epoxy resin, said layers having about 20 wt % resin (based on weight of fibers), and openings of about 0.67 mm; and an envelope of two sheets of tightly woven fiberglass cloth imperviously coated with polytetrafluoroethylene (Model Number TFE30 obtained from DuPont de Nemours & Co.) and heat-sealed around their edges.

Structure 2 had outer dimensions of approximately 7×7×0.5 inches.

EXAMPLE 1

The thermal attenuation properties of Structures 1 and 2 and of conventional fiberglass (commercial grade building insulation obtained from Certainteed Corporation, P. 0. Box 860, Valley Forge, Pa., having fiber diameters of about 8–10 micrometers and external dimensions of 6×6×1 inch) were compared by the procedure described below.

The sample insulation was placed on a 6×6" hotplate heated to 320° F. with a 6×6" aluminum plate on top and a 4.5 lb. weight centered on the aluminum plate. The cool side temperature of the sample was measured at equilibrium conditions, i.e., after 4 hours.

The data, in degrees Fahrenheit, are presented below in Table 1.

TABLE 1

| Structure 1 (1" thick) | Structure 2 (½" thick) | Conventional Fiberglass (1" thick) |
|---|---|---|
| 95° | 130° | 119° |

EXAMPLE 2

The thermal attenuation properties of Structures 1 and 2 were evaluated further as described in Example 1 above except that the hotplate was heated to a temperature of 500° F. Conventional fiberglass could not be evaluated because it was incapable of withstanding this temperature.

The data, in degrees Fahrenheit, are reported below in Table 2.

TABLE 2

| Structure 1 (1" thick) | Structure 2 (½" thick) |
|---|---|
| 145° | 200° |

EXAMPLE 3

The sound attenuation properties of Structure 2 and conventional fiberglass (described in Example 1 above) were compared by the procedure described below.

A noise generator with a sound-conducting tube was set to produce noise at a level of 120 decibels (db) at the mouth of the sound-conducting tube. The noise level was measured at 12 inches (in) and 36 inches distant from the mouth of the tube. The sample insulation then was placed over the mouth of the tube and the noise level again measured at 12 inches and 36 inches distant.

The data, in decibels, are reported below in Table 3.

TABLE 3

| Location | Uninsulated | Structure 2 (½" thick) | Conventional Fiberglass (1" thick) |
|---|---|---|---|
| 12 in | 106 | 80 | 89 |
| 36 in | 91 | 74 | 76 |

EXAMPLE 4

The compressibility of Structure 1 and of the conventional fiberglass (described in Example 1 above) was compared by evenly distributing a load across their surfaces and measuring the resulting compression.

The data, in percent compression, are presented below in Table 4.

TABLE 4

| Load (lbs/6" × 6" area) | Structure 1 | Conventional Fiberglass |
| --- | --- | --- |
| 1 | 4 | 38 |
| 2 | 9 | 60 |
| 3 | 12 | 65 |
| 4 | 16 | 69 |

I claim:

1. An insulating structure comprising:
   (1) insulating material comprising one or more high density, thermal/acoustical layers of highly bonded fibers; and
   (2) a chemically-resistant, impermeable envelope enclosing said insulating material.

2. The insulating structure of claim 1 wherein said thermal/acoustical layers comprise fibers bonded at the majority of fiber-to-fiber contacts and a multiplicity of air pockets of a size about the diameter size of the fibers.

3. The insulating structure of claim 2 wherein said bonded fibers are fiberglass bonded with a thermosetting resin.

4. The insulating structure of claim 3 wherein said thermosetting binder resin is selected from the group comprising chlorinated ethylene vinyl acetatel, phenolic, epoxy and epoxy/phenolate resins.

5. The insulating structure of claim 3 wherein said thermal/acoustical layers have a thickness of from about 10 to about 200 mils and densities of from about 3.0 to about 8.0 lb/ft$^3$ and said insulating material has a thickness of from about 0.25 to about 2 inches and comprises from about 100 to about 5 of said thermal/acoustical layers per inch of said insulating material.

6. The insulating structure of claim 1 wherein said envelope comprises two sheets of tightly woven fiberglass having a film-like coating selected from the group comprising fluorocarbon polymer and silicone rubber coatings and being sealed together at their edges.

7. The insulating structure of claim 6 wherein said envelope comprises sealed mounting flanges extending from each edge of the envelope.

8. The insulating structure of claim 7 wherein said envelope comprises means for removably attaching the insulating structure to a surface which is to be insulated.

9. The insulating structure of claim 1 wherein said insulating material comprises one or more thermal/acoustical layers of highly bonded fibers and one or more acoustical layers of loosely woven fiber cloth.

10. The insulating structure of claim 9 wherein said acoustical layers comprise loosely woven fiberglass cloth coated with a thermosetting resin.

11. The insulating structure of claim 10 wherein said thermosetting resin is selected from the group comprising chlorinated ethylene vinyl acetatel, phenolic, epoxy and epoxy/phenolate resins.

12. The insulating structure of claim 10 wherein said cloth comprises openings ranging from about 0.050 to about 5.0 millimeters in diameter.

13. The insulating structure of claim 10 wherein the insulating material comprises from 1 to about 5 acoustical layers per inch of insulating material.

* * * * *